March 1, 1966 H. E. BROOKS, JR 3,237,450
LOAD CELL
Filed March 25, 1963
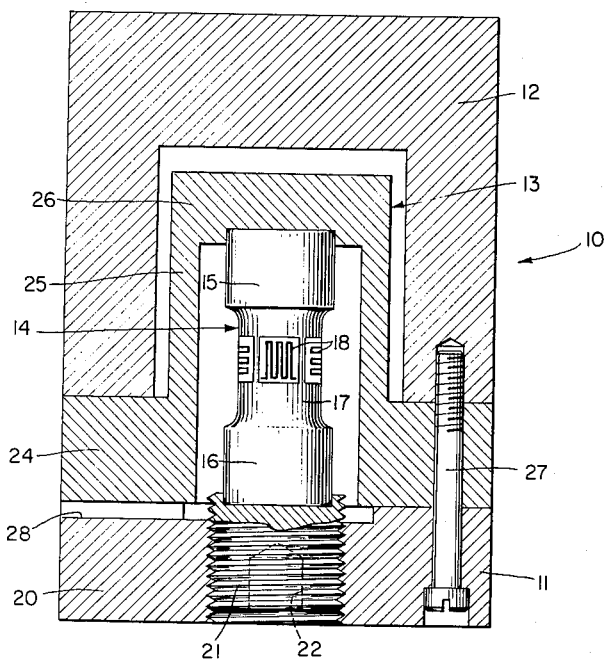
INVENTOR.
HARRY E. BROOKS, JR.
BY William R. Nolte
AGENT

United States Patent Office 3,237,450
Patented Mar. 1, 1966

3,237,450
LOAD CELL
Harry E. Brooks, Jr., Phoenixville, Pa., assignor to The Budd Company, Philadelphia, Pa., a corporation of Pennsylvania
Filed Mar. 25, 1963, Ser. No. 267,602
4 Claims. (Cl. 73—141)

This invention relates to a load cell comprising a resistance type strain gage bonded to a spring element or column in such a manner as to be sensitive to axial loading of the spring element.

As is well known, resistance type strain gages operate on the principle that changes in the strain applied to such a gage varies the electrical resistance of the gage an amount proportional to such changes. By measuring the resistance of the gage, the forces producing the strain can be determined. Also well known is the fact that such gages are limited in the amount of strain to which they can be subjected. For many gages this strain limit is less than 5%.

Heretofore, most load cells have been constructed so that the full load being measured is transmitted through the spring element. Hence, the maximum load which can be measured by such a load cell is limited to the strain limit of the strain gages and, for relatively large loads, the load cells and spring elements are large.

Accordingly, one of the objects of the invention is to provide a relatively small load cell for measuring relatively large loads.

Another object is to provide a load cell wherein only a predetermined fractional part or portion of the applied load passes through the spring element upon which an active strain gage is mounted.

Still another object of the invention is to provide a highly compact, miniature load cell.

Another object is to provide a load cell wherein the load is transmitted through the load cell along two paths so that the strain in one of the paths is less than that in the other path.

Other objects and advantages will be apparent from the following description taken in connection with the accompanying drawing which is a longitudinal section view through a load cell embodying the invention.

Referring now to the drawing, there is illustrated a cylindrical load cell 10, comprising a base 11, a cover 12, and a pair of spring elements 13 and 14. The load cell is of a type adapted to be loaded by subjecting it to axially directed forces applied to the ends of the load cell, i.e., to the upper and lower surfaces of cover 12 and base 11 respectively. The base, cover and spring elements are of metal, preferably steel, and are dimensioned to be loaded within the elastic limits of the material.

Spring element 14 is in the form of a cylindrical column having ends 15 and 16 of enlarged diameter and a cylindrical portion 17 of reduced diameter. There are four, resistance-type strain gages 18 bonded to central portion 17 in a conventional manner, the gages being adapted to be connected in a conventional strain gage bridge circuit such as the well known Wheatstone bridge. Spring element 14 extends longitudinally along the axis of the load cell and is coaxial therewith. The spring element 14 is of a size such that if the maximum load of the load cell were fully applied thereto, it would fail through exceeding the strain limit of the spring element and strain gages.

Base 11 comprises an annular circular plate 20 and plug 21 threaded into the center of plate 20. Plug 21 has an exposed, wrench socket 22 which is adapted to receive a suitable wrench so that the plug can be turned to provide zero adjustment of the spring element 14. Such zero adjustment is necessary because of the fact that the amount of strain on the spring element 14 is relatively small compared to manufacturing tolerances in making the parts and the spring element, in order to function properly, should not be either loosely held between base 11 and spring element 13 nor tightly held to impose a high degree of initial strain on the element. Preferably, the plug 21 would be adjusted so as to impose a pre-load strain in the order of 1% of the maximum amount of strain to which the element will be subjected.

Cover 12 is cup-shaped and fits over the upper end of spring element 13. The lower end of cover 12 is flat and annular and abuts spring element 13 as described below.

Spring element 13 is also cup-shaped, but in a manner slightly different from that of cover 12, and comprises an annular ring 24 concentric to spring element 14, a cylindrical, tubular sleeve 25 which extends upwardly from the inner edge of ring 24 and terminates adjacent to the upper end of spring element 14, and a circular end plate 26 covering the upper end of sleeve 25 and abutting, at its underface, the upper end of spring element 14. The upper and lower surfaces of ring 24 abut the lower end of cover 12 and the upper, annular face of base 11, respectively, such engagement being flush so that the applied loads are evenly distributed over the faces of the ring.

The base, cover and spring element are held together by any suitable means 27 here illustrated as a machine screw whose threaded end is screwed into cover 12 and whose shank slidingly passes through ring 24 and base 11. The head of the screw normally abuts a downwardly facing shoulder on base 11 but the head is free to move downwardly relative to the base upon the application of compressive forces to the load cell. The base 11 is provided with an upwardly facing radial groove 28 through which leads to the strain gages can pass.

As previously indicated, the load cell is adapted to measure compressive loads applied axially to the load cell. A compressive load applied in this manner compresses ring 24 between cover 12 and base 11 and thereby causes it to contract axially. The load is transmitted through the spring elements along two paths. In one path, a portion of the load passes directly through ring 24 causing it to contract, in the manner previously indicated, an amount proportional to that portion of the load passing therethrough. In the other path, the remainder of the load passes through sleeve 25, plate 26 and spring element 14 whereby the sleeve is placed in tension primarily and the spring element 14 is placed in compression. Such compression of spring element 14 causes it to contract whereby the compressive strain varies the resistance of strain gages 18 an amount proportional to the compressive load causing such strain. The sleeve pulling down on plate 26 produces a slight bending of the plate between the upper end of sleeve 25 and end 15 of spring element 14 but this bending can be minimized by making plate 26 relatively thick.

With the illustrated arrangement, the axial contraction of spring element 14 is always less than the contraction of ring 24 and, since the length of ring 24 is less than that of spring element 14, the strain on spring element 14 is always less than that of the ring. By dimensioning the lengths and transverse sectional areas proportionately, the amount or portion of the load transmitted through spring element 14 can be made considerably less than or a fractional amount of the load which passes through the ring. For example, the load cell can be designed with a maximum capacity of 200,000 pounds wherein 150,000 pounds is transmitted through the ring and the remaining 50,000 pounds passes through element 14. Thus, a spring element 14 can be used for measuring loads which, if they were to be fully applied to the spring element, would cause it and the strain gages attached thereto to exceed their strain limit.

While only a single embodiment of the invention has been illustrated, it will be apparent to those skilled in the art, that changes can be made in the details of construction and arrangement of parts without departing from the scope of the invention as defined in the appended claims.

I claim:

1. A load cell comprising: a flat circular base; a spring element comprising a flat ring abutting said base, a cylindrical sleeve integral with said ring and extending away from said base, and a plate integral with and covering said sleeve, said plate being spaced from said base; a gage column disposed coaxial with said spring element and having its ends abutting said plate and said base for compression through said sleeve and plate; said column being longer than the axial length of said ring; strain gage means mounted on said column; and a cover abutting said ring and capable of transferring an axial test load to said gage column whereby, the major portion of such load passes directly through said ring to thereby strain said gage column an amount less than the strain in said ring.

2. A load cell in accordance with claim 1 wherein said base includes plug means threaded therein for adjustable movement along the axis of said sleeve, said plug means having a surface engageable with one end of said gage column thereby to provide an initial predetermined load setting on said gage column.

3. A load cell for measuring a compressive force comprising a base, gage column means having one end supported on said base and aligned along an axis normal to said base, first deformable means disposed coaxially with said gage column means and having top and bottom surfaces with its bottom surface mounted on said base, second deformable means integral with said first deformable means and extending outwardly from the top surface of the latter to engage the opposite end of said gage column means, and means engaging the top surface of said first deformable means to transmit a compressive force to contract the same between said base whereby said second deformable means is deformed in tension as said gage column means is placed in compression.

4. A load cell for measuring an axial compressive force comprising a base, gage column means having one end supported on said base and disposed in upstanding relationship thereto, deformable means encircling said gage column means and including a base portion having top and bottom surfaces with the bottom surface thereof engaging said base, an elongated upper portion extending above the top surface of said base portion and engaging the upper end of said gage column means, and means engaging the top surface of said base portion of said deformable means to transmit a compressive force to contract the same between said base whereby the elongated portion of said deformable means is deformed in tension as said gage column means is placed in compression.

References Cited by the Examiner

UNITED STATES PATENTS

| 2,582,886 | 1/1952 | Ruge | 73—141 |
| 2,814,946 | 12/1957 | Harris | 73—141 |
| 2,925,573 | 2/1960 | Brown et al. | 73—88.5 |
| 2,929,885 | 4/1960 | Mueller | 73—88.5 |

RICHARD C. QUEISSER, *Primary Examiner.*

E. KARLSEN, C. M. GRON, *Assistant Examiners.*